United States Patent [19]

Kruse et al.

[11] 4,187,260
[45] Feb. 5, 1980

[54] MASS POLYMERIZATION PROCESS FOR POLYBLENDS

[75] Inventors: Robert L. Kruse, Springfield; Gene E. DeJackome, Orange, both of Mass.

[73] Assignee: Monsanto Company, St. Louis, Mo.

[21] Appl. No.: 716,605

[22] Filed: Aug. 23, 1976

[51] Int. Cl.² .................................................. C08F 279/02
[52] U.S. Cl. ..................................... 525/263; 525/243
[58] Field of Search ..................................... 260/880 R

[56] References Cited

U.S. PATENT DOCUMENTS

| | | | |
|---|---|---|---|
| 3,541,187 | 11/1970 | Harris | 260/880 R |
| 3,751,524 | 8/1973 | Haigh | 260/880 R |
| 3,855,354 | 12/1974 | Takizawa | 260/880 R |
| 3,919,354 | 11/1975 | Moore | 260/880 R |

*Primary Examiner*—Paul R. Michl
*Attorney, Agent, or Firm*—Joseph S. Nelson; William J. Farrington; Edward P. Grattan

[57] ABSTRACT

The invention relates to an improved process for the mass polymerization of solutions comprising monoalkenyl aromatic monomers and optionally monoalkenyl nitrile monomers having a diene rubber dissolved therein wherein the improvement comprises dissolving a minor amount of an organic diperoxide compound in said solution and mass polymerizing said solution, said diperoxide initiating a higher molecular weight polymer fraction providing said polymer with a broader molecular weight distribution.

2 Claims, No Drawings

MASS POLYMERIZATION PROCESS FOR POLYBLENDS

BACKGROUND OF THE INVENTION

As is well known, polyblends of rubber with monoalkenyl aromatic polymers have significant advantages in providing compositions of desirable resistance to impact for many applications. Various processes have been suggested or utilized for the manufacture of such polyblends including emulsion, suspension and mass polymerization techniques, and combinations thereof. Although graft blends of a monoalkenyl aromatic monomer and rubber prepared in mass exhibit desirable properties, this technique has a practical limitation upon the maximum degree of conversion of monomers to polymer which can be effected because of the high viscosities and accompanying power and equipment requirements, which are encountered when the reactions are carried beyond a fairly low degree of conversion after phase inversion takes place. As a result, techniques have been adopted wherein the initial polymerization is carried out in mass to a point of conversion beyond phase inversion at which the viscosity levels are still of practical magnitudes, after which the resulting prepolymerization syrup is suspended in water or other inert liquid and mass polymerization of the monomers carried to substantial completion.

Stein, et.al. in U.S. Pat. No. 2,862,906 discloses a mass suspension method of polymerization styrene having diene rubbers dissolved therein with the rubber being grafted, inverted and dispersed as rubber particles under agitation. After phase inversion, the viscous mixture is suspended in water and mass polymerization is completed producing a polyblend in the form of beads.

Such mass suspension processes are used commercially, however, present the economic problems of batch operations requiring long cycles at relatively low temperatures to control the heat of polymerization. Continuous mass polymerization processes have great economic advantages if they can be run at higher temperatures and higher rates with the necessary control of the great heats of polymerization. In the case of polyblends, the dispersed rubber phase must be formed and stabilized as to its morphology, bringing it through the continuous polymerization of the rigid matrix polymer phase so that the physical properties of the polyblend meet exacting property specifications.

Various methods have been developed for the continuous mass polymerization of polyblends. Ruffing, et.al., in U.S. Pat. No. 3,243,481 disclose a process wherein diene rubbers are dissolved in predominantly monovinylidene aromatic monomers and polymerized in four reaction zones.

U.S. Pat. No. 3,903,202 discloses a process for the continuous mass polymerization of polyblends using two reactors as a more simple process for mass polymerizing such polyblends.

Hence, the mass polymerization of rubber-monomer solutions by batch or continuous mass polymerization are known as well as batch mass-suspension processes in that the suspended droplets polymerize by mass polymerization kinetics and the beads formed are miniature mass polymerization systems. The present process then is adaptable to mass polymerization processes of the type described.

The above processes all produce polyblends that have a dispersed and grafted rubber phase. It has been found that the polyblends are toughened by the rubber phase in direct proportion to the rubber content. Beyond the rubber content it has been found that the efficiency of the rubber in toughening is greatly enhanced by grafting the rubber with the polymer of the matrix phase to provide an interfacial compatibility between the rubber phase and the matrix phase.

Generally, the rubber is grafted from about 10 to 100 percent with the matrix monomers with the rubber as a substrate and the graft monomers forming graft polymers as superstrate.

Prior art processes have used monofunctional organic peroxides to initiate polymerization of the monomers and also extract the allylic hydrogen from the rubber so that the monomers would graft to the rubber more efficiently.

It has been found that higher levels of graft are formed by using higher levels of initiators, however, the increased use of initiators lowers the molecular weight of the matrix phase giving a net lowering of other properties. Hence, a need exists for a process that will increase the grafting of the rubber phase yet allows the matrix phase polymers to reach optimum molecular weights and molecular weight distribution consistent with optimum physical properties and improved processing properties.

It is the objective of the present invention to provide an improved mass polymerization process for rubber-monomer solutions that will provide maximized grafting of the rubber phase in conjunction with an optimized matrix phase molecular weight and molecular weight distribution giving polyblends with improved processing properties required for molding and extrusion.

SUMMARY OF THE INVENTION

It has been found that the above objective can be accomplished by the present process which relates to an improved process for the mass polymerizing of a solution comprising a monoalkenyl aromatic monomer having a diene rubber dissolved therein wherein the improvement comprises:

A. dissolving a minor amount of an organic diperoxide initiator in said solution, B. mass polymerizing said solution at temperatures of from about 80°–180° C., with agitation, C. forming polymer molecules of said monomers as a matrix phase having dispersed therein a diene rubber phase as rubber particles grafted with and having occluded at least a portion of said polymer molecules, said diperoxide compound being selected such that, during polymerization, said diperoxide compound initiates a higher molecular weight polymer fraction providing said polymer with a broader molecular weight distribution.

PREFERRED EMBODIMENTS

Monomers

The monomer used in the present invention comprises at least one monoalkenyl aromatic monomer of the formula:

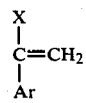

$$\begin{array}{c} X \\ | \\ C=CH_2 \\ | \\ Ar \end{array}$$

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

The process can also be used to polymerize monomer solution of a diene rubber wherein comonomers are used with the monoalkenyl aromatic monomers, in particular the alkenyl nitrile monomers such as acrylonitrile and methacrylonitrile and mixtures thereof. Here, such monomer solutions comprise about 60 to 99 percent by weight of the monoalkenyl aromatic monomer, 1 to 39 percent by weight of an alkenyl nitrile monomer and about 1 to 20 percent by weight of said diene rubber, forming monoalkenyl aromatic copolymer polyblends of said solution composition.

In addition to the monomers to be polymerized, the formulation can contain other desirable components such as stabilizers, molecular weight regulators, etc.

The polymerization is initiated by any free radical organic diperoxide initiator compound. Exemplary diperoxide initiators are the diperoxy esters, e.g. 2,5 dimethyl-2,5-bis(benzoylperoxy) hexane, di-t-butyl diperoxy phthalate, 2,5 dimethyl-2,5-bis(2 ethylhexanoyl peroxy) hexane, 2,5, dimethyl, 2,5 di(benzoyl peroxy) hexyne-3, 2,5, dimethyl, 2,5 di(decanoyl peroxy) hexyne-3, 2,5, dimethyl, 2,5 di(valeroyl peroxy) hexyne-3, 2,5, dimethyl-2,5-di(4-methyl benzoyl peroxy) hexane, 2,5, dimethyl-2,5-di(3-methyl benzoyl peroxy) hexane, 2,5, dimethyl 2,5-di(4-t-butyl benzoyl peroxy) hexane, 2,5, dimethyl, 2,5 di(2-methyl benzoyl peroxy) hexyne-3, 2,5, dimethyl, 2,5 di(3,5,5 trimethyl hexanoyl peroxy) hexane, 2,5, dimethyl, 2,5 di(deconyl peroxy) hexane, 2,5, dimethyl, 2,5 di(octanoyl peroxy) hexane, 2,5, dimethyl-2,5-di(2-methyl benzoyl peroxy) hexane, 2,7-dimethyl 2,7 di(octanoyl peroxy) octane, 2,7-dimethyl 2,7 di(decanoyl peroxy) octane, 2,5 dimethyl, 2,5 di(valeroyl peroxy) hexane, 2,7, dimethyl 2,7 di(valeroyl peroxy) octane, 2,7, dimethyl 2,7 di(2-methyl benzoyl peroxy) octane, 2,5 dimethyl, 2,5 di(2-ethoxy benzoyl peroxy) hexane, etc.

Another class is the alkyl diperoxides, e.g., 1,1-bis(t-butyl peroxy) 3,3,5 trimethyl cyclohexane, 2,2, bis(t-butyl peroxy) butane, α,α'-bis(t-butylperoxy) diisopropyl benzene, 2,5, dimethyl-2,5-bis(t-butyl peroxy) hexane, 2,5,-dimethyl-2,5-bis (t-butyl peroxy) hexyne-3, 2,5,-dimethyl-2,5,-bis(octanoyl peroxy) hexyne-3, di-t-butyl diperoxy carbonate, 3,3,-di(t-butyl peroxy) heptane, 2,2,-bis(t-butyl peroxy) 4-methyl pentane, ethyl 3,3-bis(t-butyl peroxy) butyrate, n-butyl, 4,4-bis(t-butyl peroxy) valerate, 4,4-bis(t-butyl peroxy) 2,6-dimethyl hexane, 2,2-bis(4,4 di-t-butyl peroxy cyclohexyl) propane, etc.

Another class is the dihydroperoxides, e.g., methyl, ethyl ketone peroxy dihydroperoxide, 2,5-dihydroperoxy 2,5 dimethyl hexane, phthalyol dihydroperoxide, etc.

Another class is the diperoxyketals, e.g. 1,1,-di-(t-butyl peroxy) cyclohexane, 3,5,5-trimethyl cyclohexane, etc.

Many others are described in the Encyclopedia of Chemical Technology, Vol. 14, (1967) pages 804–807.

The catalyst is dissolved in the solution within the range of 0.001 to 3.0 percent by weight, and preferably on the order of 0.005 to 1.0 percent by weight of the polymerizable material, depending primarily upon polymerization temperatures.

As is well known, it is often desirable to incorporate molecular weight regulators such as mercaptans, halides and terpenes in relatively small percentages by weight, on the order of 0.001 to 1.0 percent by weight of the polymerizable material. From 2 to 20 percent diluents such as ethylbenzene, ethyltoluene, ethylxylene, diethylbenzene or benzene may be added to the monomer composition to control viscosities at high conversions and also provide some molecular weight regulation. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

Rubbers

The diene rubbers used are those soluble in the monomers described. The preferred diene rubbers are those having a second order transition temperature not higher than 0° centigrade, preferably not higher than −20° centigrade, as determined by ASTM Test D-746-52T of one or more of the conjugated, 1,3 dienes, e.g. butadiene, isoprene, 1 and 2-chloro-1, 3-butadiene, cyclopentadiene-1,3, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl-4-chlorostyrene, etc.); acrylonitrile; methacrylonitrile; alkyl acrylates (e.g. methyl acrylate, butyl acrylate, 2-ethyl hexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

Although the rubber may contain up to about 2.0 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are the stereospecific polybutadiene rubbers formed by the polymerization of 1,3-butadiene. These rubbers have a cis-isomer content of about 30–98 percent and a trans-isomer content of about 70–2 percent and generally contain at least about 85 percent of polybutadiene formed by 1,4 addition with no more than about 15 percent by 1,2 addition. Mooney viscosities of the rubber (ML-4, 212° F.) can range from about 20 to 70 with a second order transition temperature of from about −50° to −105° C. as determined by ASTM Test D-746-52T.

Organic Diperoxy Initiators

The initiators used to initiate the polymerization of the monomers and the grafting of the rubber are organic diperoxides as disclosed. The catalysts are dissolved in the polymerization solution of monomer and rubber initially or can be added continuously or in increments depending on the temperature schedule used in polymerization.

The mechanism by which the diperoxides produce higher molecular weight polymer fractions is not clearly understood but is believed that at least about one-third of the diperoxide initiators will decompose such that a diradical initiator or difunctional initiator is formed that initiates growth of polymer from both free radicals providing a fraction of higher molecular polymer which is about one-third of the molecular population. About two-thirds of the diperoxy initiator also decomposes as a monofunctional initiator which produces polymer of low and average molecular weight populations. The composite effect then provides a polymer of broader molecular weight distribution that has a higher fraction of higher molecular weight molecules that provide improved processing and fabricating properties without sacrifice of physical properties.

Molecular weight is characterized by number average molecular weights ($M_n$) wherein $M_n$ = total weight of molecules/total number of molecules or $M_n = \epsilon n.M/\epsilon n$ where n = number of molecules
M = molecular weight The weight average molecular weight ($M_w$) is characterized by:

$$M_w = \epsilon n.M^2/\epsilon n.M$$

The weight average molecular weight of the large molecular fraction $M_z$ is characterized by:

$$M_z = \epsilon n.M^3/\epsilon n.M^2$$

The various molecular weights can be determined as described in Principals of Polymer Chemistry, P. J. Flory, Cornell University Press, Ithica, New York, (1953), pages 266–316 and Polymer Chemistry. Bruno Vollmert, Springer-Verlay Press, New York, N.Y., (1973), pages 332–435 provides gel permeation chromatography procedures.

Such systems have been automated using a Waters Instrument wherein polymer solutions are passed through a fractionating column wherein the concentration of polymer is determined by a diferential refractometer and the molecular weight by the intensity of the scattered light. By means of a calculator the measured results are transferred to a recorder which immediately gives the molecular weight distribution curve from which $M_n$, $M_w$ and $M_z$ can be obtained. Such procedures are described in Polymer Chemistry, Bruno Vollmert, Springer-Verlag Press, New York, New York (1973), pages 332–435.

Process

It is known to polymerize styrene monomer in the presence of dissolved diene rubbers in stirred tank reactors to form polyblends of styrene grafted rubber and polystyrene. As the styrene polymerizes to polystyrene it forms a monomer-polymer solution as a separate phase in the monomer-rubber solution phase. Some of the polystyrene grafts onto the rubber forming a grafted rubber in the monomer-rubber phase.

The monomer-polymer phase increases in volume with conversion of the styrene monomer and as that volume becomes larger than the monomer-rubber phase then an inversion occurs with the monomer-rubber phase dispersing as monomer-rubber droplets in the monomer-polymer phase. The grafted rubber exists at the interface of the droplet acting as a surfactant helping disperse and stabilizing the monomer-rubber droplets. The agitation of the stirred reactor aids the inversion phenomenon and helps size the monomer-rubber droplets. This agitation must be sufficient to both create shearing agitation and produce agitation throughout the entire polymerizing mixture to insure homogeneity both as to the mixture and its temperature. The agitation must insure sufficient shearing action to size and disperse the monomer-rubber globules. Such agitation will vary with the size of the vessel, the type of agitator and viscosity of the mixture.

Stein, et.al. in U.S. Pat. No. 2,862,906 disclose a process for mass polymerizing polystyrene in the presence of diene rubber in a first stirred tank reactor up through the phase inversion of the rubber and then suspending the partially polymerized syrup or prepolymer in water in a second reactor and completing the mass polymerization realizing excellent heat control and producing a polyblend in the form of beads. Such processes are used commercially but present the problem of batch operations.

The prepolymerization step is very important in providing a polyblend with superior physical properties of molding and sheet products. Here, the impact strength or toughness and gloss of the fabricated article are of primary importance. Both impact strength and gloss are dependent on the rubber particle properties and the amount used in the polyblend. Small particles give good gloss but low toughness whereas large particles give good toughness but low gloss. A balance is realized in a optimum product by controlling the particle size and the amount of grafted styrene within the particle. These monomer-rubber particles are formed in the first reactor and become stabilized by grafting. When the prepolymer is suspended in water they then polymerize progressively under uniform temperatures with the matrix phase in the suspended bead much as in a mass process.

The monomer-rubber particles contain grafted rubber but also occluded polymer formed by polymerization of the monomer in the droplet as polymer. The amount of grafted polymer can vary in the rubber droplets which form discrete rubber particles as all of the monomer is polymerized, said grafted and occluded polymer being present in the rubber particle in a preferred amount of about 1 to 5 parts for each part of rubber.

The monomer-rubber droplet then polymerizes as a separate system in the monomer-polymer phase each developing a progressively large polymer phase as conversion of the monomer is carried out. The occluded polymer in the rubber particle is an important feature of the morphology of the particle. Some of the rubber is grafted which stabilizes its dispersion in the polyblend matrix. Some of the polymer being formed crosslinks the rubber particle insuring its particle size integrity so important to physical properties. The rest of the occluded polymer serves as a filler or extender for the rubber particle giving it a higher efficiency as a rubber phase in toughening polyblends particularly those of the polystyrene family of polymers such as impact polystyrene and ABS polyblends.

Because of the critical nature of the rubber particle phase, it must be formed correctly in the first prepolymerization reactor as described and then that structure or morphology must be maintained in any further polymerization system using to complete the polymerization. The batch mass-suspension system of Stein, et.al. preserves the rubber structure using a suspension reaction system to gradually polymerize the remaining monomers. The prepoly syrup is generally suspended at 10 to 40 percent conversion and gradually mass polymerized to full conversion as beads. Here, the monomer polymerizing in the monomer-rubber phase and the monomer-polymer phase are polymerizing at the same rate and monomer concentrations in each phase remain about the same with no extraction of critical monomer from the rubber phase to lower its occluded polymer content.

In developing a continuous process for the mass polymerizing monomer-rubber solutions one must consider the same process and product requirements to producing acceptable polyblends. It has been found that continuous mass polymerization in a stirred tank reactor can be run under steady-state polymerization conditions forming a dispersed rubber phase with a controlled feed of monomer-rubber solution and controlled withdrawal of partially polymerized syrup. The effluent of the first continuous stirred tank reactor can then be fed continuously to a staged isobaric stirred reactor as disclosed in U.S. Pat. No. 3,903,202 to further the polymerization yet preserve the morphology of the rubber phase particles. Both reactors are run at variable fillage so that products of varying and predetermined molecular weight can be made at any predetermined rate.

The staged isobaric reactor operates under substantially linear flow with progressive polymerization from the first to last stage. The prepolymerization syrup is fed to the first stage of the staged isobaric stirred reactor (SISR) and polymerizes under conversion levels only slightly higher than the continuous stirred tank reactor (CSTR). This is necessary to insure that the rubber phase maintains its morphology. If the prepolymerization syrup at 10 to 40 percent conversion were fed to a second continuous stirred tank reactor operating at 75 percent conversion there would be a substantial loss of monomer from the monomer-rubber droplets lowering the possible amounts of occluded polymer to be formed in the rubber particle. Prior art processes have overcome this problem by using a series of separated tower reactors each operating at a slightly higher conversion to progressively polymerize the monomer-polymer solution. Ruffing, et.al. in U.S. Pat. No. 3,243,481 uses a series of separated tower reactors to progressively polymerize polyblends containing rubber.

The SISR reactor provides staged polymerization in one reactor operating under constant but variable fillage and isobaric boiling conditions. The SISR provides means to remove monomer from all stages simultaneously allowing each stage to operate under controlled temperatures. Means to condense said vapors and bring them back into the first stages where the highest polyrates are realized are provided for highly efficient conversion of monomers per unit volume of reactor. The SISR provides shearing agitation to insure the uniformity of the viscous polymerizing mixture in each stage maintaining the morphology of the rubber particles.

The present process can be adapted to any suitable mass polymerization process as described above and are incorporated by reference. The present process is an improved process for the mass polymerizing of a solution comprising a monoalkenyl aromatic monomer having a diene rubber dissolved therein wherein the improvement comprises:

A. dissolving a minor amount of an organic diperoxide initiator in said solution, B. mass polymerizing said solution at temperatures of from about 80°–180° C., with agitation, C. forming polymer molecules of said monomers as a matrix phase having dispersed therein a diene rubber phase as rubber particles grafted with and having occluded at least a portion of said polymer molecules, said diperoxide compound being selected such that, during polymerization, said diperoxide compound initiates a higher molecular weight polymer fraction providing said polymer with a broader molecular weight distribution.

Step A of dissolving a minor amount of an organic diperoxide compound in the monomer-rubber solution is carried out in the polymerization reactor after the solution has been charged. Preferably, the diperoxides are added initially before the solution is brought to polymerization temperatures, however, incremental or continuous adds may be made during the polymerization in a continuous polymerization cycle.

A monomer solution comprising a monoalkenyl aromatic monomer having about 1–20 percent by weight of a diene rubber dissolved therein is charged continuously as a monomer-rubber solution to a stirred reaction zone. A suitable reactor system is disclosed in U.S. Pat. No. 3,903,202. The monomer is polymerized at temperatures of about 110°–145° C. in the first reactor converting about 10–50 percent by weight of the monomer to a alkenyl aromatic polymer having a molecular weight of 100,000 to 500,000 $M_w$ preferably 150,000 to 350,000 $M_w$. At least a portion of the polymer polymerized is grafted as polymer molecules to the diene rubber as a superstrate.

Although the amount of polymeric superstrate grafted onto the rubber substrate may vary from as little as 10.0 parts by weight to 100.0 parts of substrate to as much as 500.0 per 100.0 parts and even higher, the preferred graft copolymers will generally have a superstrate to substrate ratio of about 100 to 250:100. With graft ratios about 150 to 250:100; a highly desirable degree of improvement in various properties generally is obtained.

The remainder of the polymer formed is dissolved in said monomer composition as polymerized forming a monomer-polymer solution. The monomer-polymer solution or phase is incompatible with the monomer-rubber solution or phase and phase separation is observed by the well known Dobry effect. As the polymer concentration of the monomer polymer-phase increases and has a volume slightly larger than the monomer-rubber phase, the monomer-rubber phase disperses as rubber-monomer particles aided by the shearing agitation of the stirred first reaction zone.

The agitation must be significant and of high enough shear to disperse and size the rubber particles uniformly throughout the monomer-polymer phase. The intensity of the stirring will vary with the size and geometry of the reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.5 to 10 microns preferably from 0.5 to 5 microns to provide a balance between the impact strength and the gloss of the rubber reinforced polyblend. Higher stirring rates and shearing agitation can lower the size of the dispersed rubber particle, hence, must be controlled to provide sufficient stirring to size the particles to the predetermined size needed and insure homogeneous dispersion.

At steady state polymerization, in the first reactor, the continuously charged monomer composition containing 1 to 20 percent by weight diene rubber disperses almost instantaneously, under stirring, forming the rubber-monomer particles which on complete polymerization form discrete rubber particles. The conversion of monomers to polymers in the first stage is controlled between 10-50 percent and must have a weight percent level that provides a polymer content in excess of the rubber content of the monomer composition to insure the dispersion of the monomer-rubber phase to a rubber-monomer particle phase having a predetermined size and being dispersed uniformly throughout the monomer-polymer phase.

The rubber particle becomes grafted with a polymer in the first stages which aids its dispersion and stabilizes the morphology of the particle. During the dispersion of the rubber-monomer particles, some monomer-polymer phase is occluded within the particle. The total amount of occluded monomer-polymer phase and grafted polymer present in the particles can be from about 1 to 5 grams for each gram said diene rubber.

The dispersed rubber phase increases the toughness of the polymeric polyblend as measured by its Izod impact strength by Test ASTM D-256-56. It has been found that the impact strength of polyblends increase with the weight percent rubber dispersed in the polyblend in the range of 1 to 20 percent as used in the present invention. The impact strength is also determined by the size of the dispersed rubber particles, with the larger particles providing higher impact strength in the range of 0.5 to 10 microns measured as a weight average particle size diameter with a photosedimentometer by the published procedure of Graves, M. J., et.al., "Size Analysis of Subsieve Powders Using a Centrifugal Photosedimentometer", British Chemical Engineering 9:742-744 (1964). A Model 3000 Particle Size Analyzer from Martin Sweets Company, 3131 West Market Street, Louisville, Ky. was used.

The weight average diameter of the rubber particles also affects gloss with smaller particles giving high gloss and the larger particles giving low gloss to the fabricated polyblend article such as a molding or sheet product. One must balance impact strength and gloss requirements in selecting an optimum rubber particle size. The range of 0.5 to 10 microns can be used with the range of 0.5 to 5 microns being preferred and 0.8 to 3 microns being most preferred for optimum impact strength and gloss.

Processwise, in the first reactor, one must (1) form and disperse the rubber particles, and (2) graft and stabilize the rubber particle maintaining its size and morphology or structure. The amount of occluded monomer-polymer phase described above is held at a predetermined level described above by steady state polymerization wherein the monomer is converted to polymer, at least a portion of which, grafts to the rubber, stabilizing the rubber particle. It has been found that the higher the amount of occlusion stabilized within the rubber particle the more efficiently the rubber phase is used in toughening the polyblend. The rubber particle acts much as a pure rubber particle if the occlusions are controlled at the amount described above during their stabilization in the initial stages and throughout the total polymerization process. The rubber particle is also grafted externally, stabilizing its structure as to size and its dispersibility in the monomer-polymer phase.

The first reactor forms a polymerization mixture of a monomer-polymer phase having the rubber phase described dispersed therein. The mixture is polymerized further by progressive multistage substantial linear flow polymerizations with the conversion of polymer advancing from about 10-50 percent conversion in the first stage to 50 to 90 percent conversion in the final stage of the staged isobaric stirred reaction zone. This provides a gradual progressive increase of polymer in the monomer-polymer phase. This has been found to be important in maintaining the morphology or structure of the dispersed rubber-monomer particles.

It has been found possible to analyze the amount of total occluded polymer phase and grafted polymers. The final polymerized polyblend product (1 gram) are dispersed in a 50/50 acetone/methyl ethyl ketone solvent (10 ml) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\% \text{ Dry Gel in Polyblend} = \frac{\text{Weight of dry gel}}{\text{Weight of polyblend}} \times 100$$

$$\left.\begin{array}{l}\% \text{ Graft and} \\ \text{Occlusions} \\ \text{in Rubber}\end{array}\right\} = \frac{\% \text{ dry gel} - \% \text{ rubber}}{\text{Percent rubber*}} \times 100$$

$$\left.\begin{array}{l}\text{Parts** by weight} \\ \text{of graft polymer} \\ \text{and occluded poly-} \\ \text{mer per unit weight} \\ \text{of rubber}\end{array}\right\} = \frac{\% \text{ dry gel} - \% \text{ rubber}}{\text{Percent rubber}}$$

*Percent rubber determined by infra-red spectrochemical analysis of the dry gel
**The present inventon preferably has present about 0.5 to 5 grams of occluded and grafted polymer per gram of diene rubber The swelling index of the rubber graft particles is determined by taking the dry gel above and dispersing it in toluene for 12 hours. The gel is separated by centrifuge and the supernatant toluene drained free. The wet gel is weighed and then dried in a vacuum over for 12 hours at 50° C. and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 5 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the monomer as it polymerizes to a polymer phase in the rubber-monomer particle. Generally, the conversion of monomer to polymer in the occlusion follows the rate of conversion of monomer to polymer in the monomer-polymer phase. If the reaction in the second reactor is brought to about 70 to 90 percent conversion rather than 99 to 100 percent conversion the polymerization mixture can be devolatilized separating the residual monomers from the polyblend. The temperatures of the polymerization mixture is raised to about 185° to 250° C. and the monomer vapors are separated to give a finished polyblend. The rubber particles become crosslinked by heating the mixture to from about 150° to 250° C. for sufficient time to crosslink the rubber particles such that they have a swelling index of from about 7 to 20 preferably from about 8 to 16.

Preferably, the polymer of the matrix phase of the polyblends produced by this invention have a dispersion index ($M_w/M_n$), wherein $M_w$ is a weight average molecular weight and $M_n$ is a number average molecular weight, ranging from about 2.0 to 4.0 preferably 2.2 to 3.5. The dispersion index is well known to those skilled in the art and represents the molecular weight distribution with the lower values having narrow molecular weight distribution and higher values having broader molecular weight distribution. The average molecular weight of the polymer of the matrix phase preferably range from 100,000 to 500,000 $M_w$, having a number average molecular weight of from about 40,000 to 200,000 $M_n$ preferably 50,000 to 100,000 $M_n$ and a $M_z$ of 300,000 to 700,000 preferably 400,000 to 650,000.

STAGED POLYMERIZATION

The polymerization after prepolymerization is preferably carried out in a generally horizontal, cylinderical, flow-through, staged, isobaric stirred reaction zone maintaining conditions so as to polymerize said first prepolymerized mixture by progressive multistage substantially linear flow-through polymerization; all said stages operating with shearing agitation and common evaporation vapor phase cooling under isobaric conditions in said reaction zone, providing each said stage with steady state polymerization at controlled temperature, and interfacial liquid contact stage-to-stage establishing a hydraulic pressure gradient from the first stage downstream to the final stage, causing substantially linear flow through said reaction zone; all said stages operating at predetermined conversion levels producing a polymer in said reaction zone having a predetermined molecular weight distribution and average molecular weight maintaining the structural integrity of said dispersed rubber particle, said reaction zone producing a polymerization mixture having a total polymer content being determined by said multistage steady state polymerization and evaporation of said monomers.

The reactor operates under controlled isobaric conditions. For the range of temperatures normally of interest for alkenyl aromatic monomers, e.g. styrene polymerization, the operating pressure will range from 6 to 29 psia. The styrene reaction is exothermic, and cooling is provided primarily by vaporization of a part of the monomer from the reacting mass. Further cooling can be provided by jacket. Cooling by the condensed recycle monomer feeding into reaction zone is also provided. The mass is in a boiling condition, and temperature is determined by the natural relationship between vapor pressure and boiling point. This relationship is also a function of the relative amounts of polymer, monomer and other substances (e.g. dissolved rubber, solvents and additives). Since, as material progresses through this reactor, the amount of polymer continuously increases and the amount of monomer correspondingly decreases via polymerization, and monomer content further decreases due to vaporization loss, the temperature progressively increases from inlet to outlet stages.

To accommodate the natural swell of the boiling mass, and to provide space for vapor disengagement, the reactor is usually run at a fillage of about 10 to 90 percent preferably 40 to 80 percent of its volume.

Vapor passes out of the reactor to an external condenser where it is condensed and may also be subcooled. This condensate may then be returned to the inlet compartment of the reactor wherein it is reheated by condensation of a fraction of the previously evolved vapors and mixed with other incoming free materials.

In a multi-compartment staged reactor, each stage is well mixed, and the reaction mass is substantially homogeneous within itself. The discs which separate the stages discourage backflow of material between compartments. The clearance between disc and shell does permit some backflow, and also permits the necessary forwarding of material through the compartments from reactor inlet to outlet giving substantially linear flow.

In a compartmented staged reactor, the first stage has a relatively low conversion level, since it is being continuously fed by monomer solution. However, the rate of conversion in this stage is relatively high because of the high concentration of monomer.

In each succeeding stage, the conversion level is higher than in the preceding one, which tends to lower the rate of conversion. Offsetting this effect, however, are the facts that the temperature is higher, and that monomer is being vaporized out of the mass. Thus, the total conversion to polymer obtained per unit fillage volume of the stage reactor is higher than that which could be obtained in a single stage reactor producing an equal final conversion level at equal temperature.

Clearance between rotating disc compartment baffles and cylindrical wall may be from 1 to 10 percent of shell radius, the larger values being appropriate to the high conversion end of the reactor where viscosity is at maximum. Stage-to-stage forward flow of the polymerizing mixture is through this clearance, and vapor from the polymerizing mixture also counterflow through the clearance, above the surface level of the mass.

The monomer-polymer solution flows through the reaction zone under substantially linear flow, with minimized back mixing, from the first stage to the final stage under a liquid pressure gradient from the first stage to the last stage. Temperature in the reaction zone is controlled by pressure wherein the pressure is regulated to cause the polymerizing solution to boil under its heat of polymerization removing a monomer-vapor phase at a rate sufficient to maintain the temperature of the polymerizing solution at a temperature of from 100° to 180° C. and under isobaric conditions of 6 to 29 psia (4,000–20,000 kg/m$^2$).

The monomer, e.g. styrene, polymerizes giving off about 300 BTU per pound polymerized. The heat of vaporization of styrene is about 150 BTU per pound vaporized, hence, the reactor generally removes about 2 pounds of monomer from the polymerizing syrup per pound of polystyrene converted which is recycled back to the polymerizing first stage at that rate to maintain steady state polymerization under controlled temperature and isobaric conditions.

In operation, the reaction zone can be filled from about 15 to 90 percent of its volume with the polymerizing solution, the remaining volume thereof being occupied by vaporized monomers. A mixture is withdrawn from the last stage of the reaction zone wherein the degree of conversion can range from about 50 percent to as high as 90 percent. The last stages of the reaction zone is generally maintained at higher temperatures (130°–180° C.) than the first reactor of the system producing polymers having average molecular weights in the lower range of 170,000 to 250,000 $M_w$. The combined polymer can have molecular weight range of 150,000 to 350,000 $M_w$. This flexibility affords the ability to produce a wide range of polymers of varying molecular weight distribution and at varying levels of fillage of the reaction zone.

In the operation of the staged reaction zone it is preferred to employ a continuous staged isobaric stirred reactor which is controlled by withdrawal of vaporized monomer above the liquid level maintained therein in order to control the temperature in such second reaction zone. This withdrawn stream of vaporized monomer is consensed in a condenser and collected in a receiver. It can be returned to the first stage of the reaction zone.

A preferred method of control of the reaction zone is the temperature within the final stage of reactor. The control system involves sensing the temperature in the liquid phase in the final stage of reactor and employing a signal so generated to control a temperature controller modified by a signal from a set point generator at a preselected temperature value. The resulting signal modified by a signal generated by sensing the pressure in the vapor phase of said reactor is employed to control a pressure controller which in turn controls a pressure valve in the vent line from the recycled condensed monomer receiver By so adjusting the pressure above the condensed monomer in the receiver the temperature of the final stage in the reactor is very closely and rapidly controlled to a preselected desired value. The temperature in each stage rapidly achieves an equilibrium value based on the reactor pressure and the polymeric solids content of the polymerizing solution in each stage.

The utilization of the present process gives an overall production process for high impact strength polyalkenyl aromatic polyblends. The polymer, dispersed rubber and monomer mixture called the polymerization mixture comprises the liquid phase effluent from the reactor. Said mixture having a polymeric solids content of from about 50 to about 90 percent by weight is withdrawn therefrom by suitable means such as a gear pump and passed to a heating and devolatilization zone or zones.

One zone of devolatilization can be operated at pressures below atmospheric, or degrees of vacuum. However, the process of the present invention can be operated by the use of two or multiple zones of devolatilization as desired. In the process outlined the vaporized alkenyl aromatic monomers as well as low oligomers thereof are removed from the first devolatilization zone, condensed and passed to a receiver. From the receiver a stream of the condensed monomers and oligomers can be recycled to the first stage of the reactor. Likewise, the monomers and oligomers vaporized in a second devolatilization zone generally operated at somewhat lower pressure than the first and withdrawn, condensed and passed to a receiver. From this receiver a stream of condensed monomers and oligomers can also be recycled to the reactor. Preferably, the oligomers vaporized in either devolatilization zone can be separated from the vaporized monomer by distillation and separately recycled to the reaction zone or purged from the process.

In the production of certain of the desired polymers it has generally been found advantageous to add certain high boiling organic compounds to the polymers produced and the addition is preferably made during polymerization. These additives include internal lubricants such as mineral oil or other heavy oil and mold release agents such as fatty acids, fatty acid esters or salts and waxes. These additions can be conveniently made to the reaction zone and are preferably made to the last stage by means of the multiple metering pumps.

When operating in the manner described above, the proper control of reactors of the variable fillage type affords one the extremely useful advantage of ability to produce polymers of specific physical properties and molecular weight distribution over a range of capacities of from as low as 30 to as high as 100 percent of design capacity for the single production facility described. This flexibility in useful capacity is highly desirable to afford ready response to changes in market demand for total polymers or in the market percentage for various polymers produced in such a production facility.

The following examples are set forth to illustrate more clearly the principles and practice of this invention to one skilled in the art. They are not intended to be restrictive but merely illustrative of the invention herein described. All parts are by weight unless otherwise indicated. All molecular weights are in weight average values unless otherwise noted.

EXAMPLE 1

A monomer-rubber solution consisting of 5.5 parts by weight of stereospecific polybutadiene rubber in 94.5 parts by weight of styrene monomer is prepared by agitating the mixture at 40° C. for 8 hours. The rubber used contains approximately 35 percent cis-1,4 structure; approximately 55 percent trans-1,4 structure, and approximately 10 percent vinyl-1,2 structure having a Mooney viscosity of the rubber (ML-4, 212° F.) at 55. To the above monomer composition is added 0.5 parts of white mineral oil, 0.1 part by weight of octadecyl 3-(3',5'-di-tertbutyl-4-hydroxyphenyl) propionate and 40 parts by weight of recycled styrene monomer. This monomer composition is fed continuously at approximately 145 lbs./hr. to a 100-gal. anchoragitated initial reactor operated at approximately 50 percent fillage and 124° C. under 5 psig. nitrogen pressure. The agitator is approximately 31 inches wide and turns at 65 rpm. A first mixture containing approximately 28 percent polystyrene is pumped from the above reactor at a continuous rate such as to maintain essentially constant fillage therein and flows to the inlet of the second reactor, a staged isobaric stirred reactor. The second reactor has approximately a 50 gal. capacity and operates at about 40 percent fillage.

The reactor is about 35 inches long. The agitator consists of a horizontal shaft on which are fixed a series of paddles about 2 inches wide alternating at right angles to one another in a manner similar to that shown in FIG. 1. Along the shaft and rotating with it are four circular discs with an average radial wall clearance of about three-eighth inch rotating at 15 rpm. These discs are positioned to divide the reactor into five stages of approximately equal volume. The pressure in this reactor is maintained at approximately 20 psia.

The second mixture in the final stage is maintained at about 166° C. and contains about 62 percent polystyrene. Styrene vapor evaporated from the second reactor is condensed and the condensate is returned to the first compartment. The second mixture is pumped continuously from the final stage at a rate to maintain essentially constant fillage in the second reactor and is delivered to the inlet of the devolatilizer preheater. The second mixture exits from the preheater at approximately 240° C. and enters a devolatilizer chamber maintained at 50 torr. Second mixture volatile vapors exiting the devolatilizer chamber are condensed and recycled to the first reactor preheater feed system. Approximately 3 lbs/hr. of the condensed devolatilized vapors are withdrawn as purge. The devolatilized melt is fed from the devolatilizer chamber to an extruder which forms it into a plurality of strands which are then cooled and cut into pellets.

| Typical Properties | |
|---|---|
| Izod Impact ⅛" × ½" bar 73° F. (ft.lb./in.) | 1.15 |
| Tensile strength at yield (lb./in.) | 3800 |
| Tensile strength at fail (lb./in.) | 3750 |
| Tensile elongation at fail (%) | 33 |
| Swelling index | 9 |
| Parts graft and occlusions/rubber | 1.43:1 |
| Rubber particle size (microns) | 1.5 |

It is to be noted that the first reactor was run at 124° C. and the second reactor at about 166° C. with the first reactor making a higher average molecular weight first polymer and the second reactor making a lower average molecular weight second polymer. The preheater of the separator step was run at 240° C. causing crosslinking of the rubber phase giving the rubber phase a swelling index 9. Some low molecular polymer may be formed during the heating and separation steps. The combined polymer of the rigid phase is found to have an average molecular weight of about 240,000 $M_w$ and a dispersion index of 3.1 representative of the molecular weight distribution. The rubber particles have a desirable morphology having a particle size of 1.5 microns and having a graft and occlusion level to rubber ratio of 1.43 to 1.0.

EXAMPLE 2

Example 1 is repeated using 0.028 percent by weight, based on said solution, of t-butyl peracetate initiator. The first reactor was operated at 114° C. with final stage of the staged reactor operated at 165° C. The initiator has a 10 hour half life at 102° C. The test data on the polymers is shown below in Table 1.

EXAMPLE 3

Example 1 is repeated using 0.026 percent by weight, based on said solution, of 2.5, dimethyl-2,5-bis(t-butyl peroxy) hexane initiator. The first reactor was operated at 121° C. with the final stage of the staged reactor operated at 165° C. The initiator has a 10 hour half-life at 119° C. The test data on the polymers is shown below in Table I.

TABLE I

| | Ex. 2 | Ex. 3 |
|---|---|---|
| Initiator | monoperoxy | diperoxy |
| Concentration | 0.028% | 0.026% |
| R-1 Temperature (°C.) | 114 | 121 |
| R-1 Polyrate (%/hr.) | 10.7 | 11.2 |
| Mw (R-1) (1) | 317 | 373 |
| Mn (R-1) (2) | 165 | 183 |
| Mz (R-1) (3) | 498 | 624 |
| Mw (product) | 188 | 184 |
| Mn (product) | 66 | 55 |
| Mz (product) | 402 | 448 |
| Mw/Mn | 2.85 | 3.35 |
| % Rubber (IR) (4) | 5.1 | 5.1 |
| Graft (5) | 1.66 | 1.70 |
| Dw microns | 1.5 | 1.5 |
| Swelling Index | 14 | 14 |
| Izod Impact (kgm.cm/cm.) | 6.6 | 6.6 |
| Falling Dart Impact | 20 | 20 |
| Tensile Strength (Yield) | 4000 | 4000 |
| Heat Distortion (°C.) | 91 | 91 |
| Melt Index (grams) | 2.5 | 2.6 |
| Spiral Flow (cm) | 34 | 39 |
| Jetting Temperature (°C.) | 207 | 238 |

(1, 2, 3) taken at about 28% conversion from Reactor.
(4) Infra-red spectrophotometric test.
(5) Parts graft and occlusions/parts of rubber.

It is evident from the data that in the first reactor the molecular weight of the polymer polymerized with the diperoxide has indeed a higher molecular weight fraction as characterized by $M_z$. This fraction carries through to the final product giving a dispersion index of 3.34 showing a broader molecular weight distribution for the diperoxide product.

The advantages of a broader molecular weight distribution (MWD) in polyblends is related to improved processing conditions such as injection molding, extrusion and thermo-forming. Specifically the $M_z$ moment of the MWD has been correlated with better molding by allowing the injection molding operation to be carried out at higher temperatures without jetting or melt instability during molding giving high gloss molded parts. It is noted that the "jetting temperature" is higher for the diperoxide product, i.e., the material can be molded at higher temperatures before "melt instability" occurs. The jetting temperature is that temperature wherein "melt instability" occurs and the stock jets into the end of the mold is cooled and "back flows" leaving weld line type marks or irregularities in the molded part. Stable melt flow allows the stock to progressively fill the mold with hot stock which does not leave irregularities as it cools at the wall of the mold. Hence, a skin of the molded part is progressively formed at the cool mold wall with hot stock flowing down the mold. A higher $M_z$ moment of the MWD prevents the tough skin from being fractured under the pressure of flowing hot stock. If the skin is fractured, irregularities called "smudge" is evident on the skin of the molded part. Such Phenomena are described in the publication, "Surface Fracture In the Injection Molding of Filled Polymer", R. L. Bauman, W. P. Taggart, R. L. Kruse, Polymer Engineering and Science, Vol. 10, No. 3, page 154, May, 1970 along with tests for jetting and smudge.

The number average molecular weight $M_n$ has been found to be a controlling factor in melt flow of thermoplastics, i.e., the lower the $M_n$ the higher the "melt flow" as determined by the well known "spiral flow" test which is a method for determining the flow properties of thermoplastic resin wherein the plastic flows along the path of a spiral cavity in the body of the mold. The length that the material flows into the cavity (cm) gives a relative indication of resin flow properties. The test was run at 500 psi (351500 kg/m$^3$) and 475° F. (245° C.).

It is apparent from the data that the weight average molecular weight is about the same for diperoxide catalyzed product, however, the $M_n$ is lower and the $M_z$ is higher. Hence, the heat distortion temperature remains high yet the spiral flow is greater and the jetting temperature is much higher for fast molding cycles without jetting providing a superior molding and extrusion polyblend for high gloss products. It is evident then that, optimum physical properties such as impact strength, tensile strength and heat distortion are maintained at optimum levels yet the critical flow and flow stability properties are maximized without loss of heat distortion and impact strength of the molded product.

EXAMPLE 4

Example 3 was repeated using 2,5, dimethyl-2,5-bis(t-butyl peroxy) hexyne-3 as the diperoxide initiator. The $M_z$ was found to be about 452,000 with the product $M_w$ to be about 230,000 and the $M_n$ to be about 65,000 providing a dispersion index of about 3.52 providing a polymer with a higher molecular weight fraction and broader molecular weight distribution than monofunctional peroxides initiated processes.

EXAMPLE 5

Examples 2 and 3 were repeated using the procedures of Example 1 with monomer-rubber solution consisting of 5.5 parts by weight of a polybutadiene rubber of Example 1 in 94.5 part weight of a monomer composition comprising 76% by weight of styrene and 24% by weight of acrylonitrile monomer. The monomer rubber solution was charged along with 40 parts of a styrene/acrylonitrile (76/24) recycle stream to the reactor as in Example 1. An ABS polyblend product was recovered. The $M_z$ of product for the t-butyl peracetate monoperoxide initiate process was found to be about 310,800 whereas the $M_z$ of the diperoxy hexane initiated process was about 360,000. The spiral flow of the mono-peroxy initiated product is about 40 cm. whereas the diperoxy hexane initiated product was about 45 cm. The jetting temperatures were found to be respectively about 215° C. and 245° C.

What is claimed is:

1. An improved process for the mass polymerizing of a solution comprising a monoalkenyl aromatic monomer having a diene rubber dissolved therein wherein the improvement comprises:
    A. dissolving a minor amount of an organic diperoxide initiator in said solution,
    B. mass polymerizing said solution at temperatures of from about 80°–180° C., with agitation,
    C. forming polymer molecules of said monomers as a matrix phase having dispersed therein a diene rubber phase as rubber particles grafted with and having occluded at least a portion of said polymer molecules, said diperoxide compound being selected such that, during polymerization, said diperoxide compound initiates a higher molecular weight polymer fraction providing said polymer with a broader molecular weight distribution, said organic diperoxide initiator being 2,5,dimethyl-2,5-bis(t-butyl peroxy) hexyne-3.

2. An improved process for the mass polymerizing of a solution comprising a monoalkenyl aromatic monomer having a diene rubber dissolved therein wherein the improvement comprises:
    A. dissolving a minor amount of an organic diperoxide initiator in said solution,
    B. mass polymerizing said solution at temperatures of from about 80°–180° C., with agitation,
    C. forming polymer molecules of said monomers as a matrix phase having dispersed therein a diene rubber phase as rubber particles grafted with and having occluded at least a portion of said polymer molecules, said diperoxide compound being selected such that, during polymerization, said diperoxide compound initiates a higher molecular weight polymer fraction providing said polymer with a broader molecular weight distribution, said organic diperoxide initiator being 2,5,dimethyl-2,5-bis(t-butyl peroxy) hexane.

* * * * *